US012574595B2

(12) United States Patent
Fanfani

(10) Patent No.: US 12,574,595 B2
(45) Date of Patent: Mar. 10, 2026

(54) SYSTEMS AND METHODS FOR EMBEDDING MEDIA IN A THIRD-PARTY APPLICATION

(71) Applicant: Warner Bros. Discovery, Inc., New York, NY (US)

(72) Inventor: Andrea Fanfani, London (GB)

(73) Assignee: Warner Bros. Discovery, Inc., New York, NY (US)

( * ) Notice: Subject to any disclaimer, the term of this patent is extended or adjusted under 35 U.S.C. 154(b) by 64 days.

(21) Appl. No.: 18/659,438

(22) Filed: May 9, 2024

(65) Prior Publication Data

US 2025/0350799 A1 Nov. 13, 2025

(51) Int. Cl.
*H04N 21/443* (2011.01)
*H04L 67/565* (2022.01)
*H04N 21/258* (2011.01)
(52) U.S. Cl.
CPC ....... *H04N 21/4433* (2013.01); *H04L 67/565* (2022.05); *H04N 21/25875* (2013.01); *H04N 21/25891* (2013.01)
(58) Field of Classification Search
CPC ......... H04N 21/4433; H04N 21/25875; H04N 21/25891; H04L 67/565
See application file for complete search history.

(56) References Cited

U.S. PATENT DOCUMENTS

| | | | |
|---|---|---|---|
| 2011/0093329 A1* | 4/2011 | Bodor | ................... G06Q 30/00 |
| 2013/0332838 A1 | 12/2013 | Naggar et al. | |
| 2016/0241922 A1* | 8/2016 | Carpenter | .......... H04N 21/4825 |

* cited by examiner

*Primary Examiner* — Anthony Bantamoi
(74) *Attorney, Agent, or Firm* — Bookoff McAndrews, PLLC

(57) ABSTRACT

Systems and methods for enabling access to media content are disclosed. One computer-implemented method may include: receiving, at a server, user authentication data provided to a media platform embedded within a hosting application; enabling, using a processor associated with the server and upon verifying the user authentication data, access to at least a portion of a media content library associated with a media content provider; providing, within the media platform, one or more content viewing options associated with the media content library; and facilitating, responsive to receiving selection of the one or more content viewing options, playback of a media article corresponding to the one or more content viewing options within the media platform on the hosting application. Other aspects are described and claimed.

20 Claims, 8 Drawing Sheets

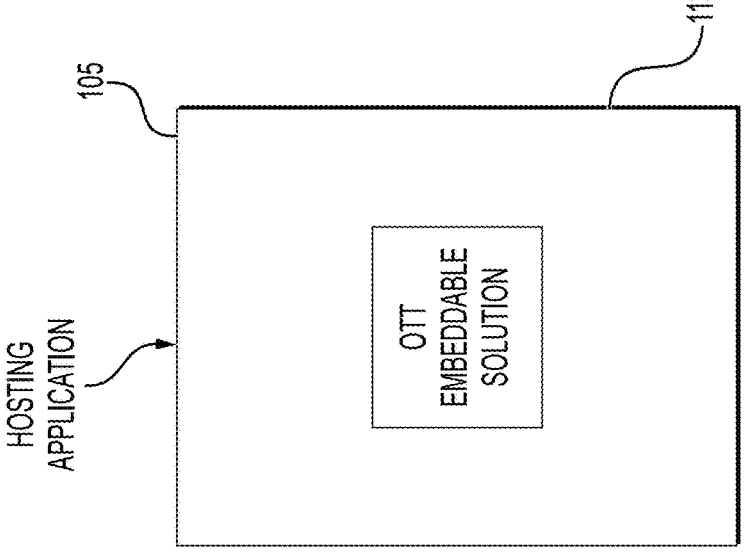
*FIG. 1*

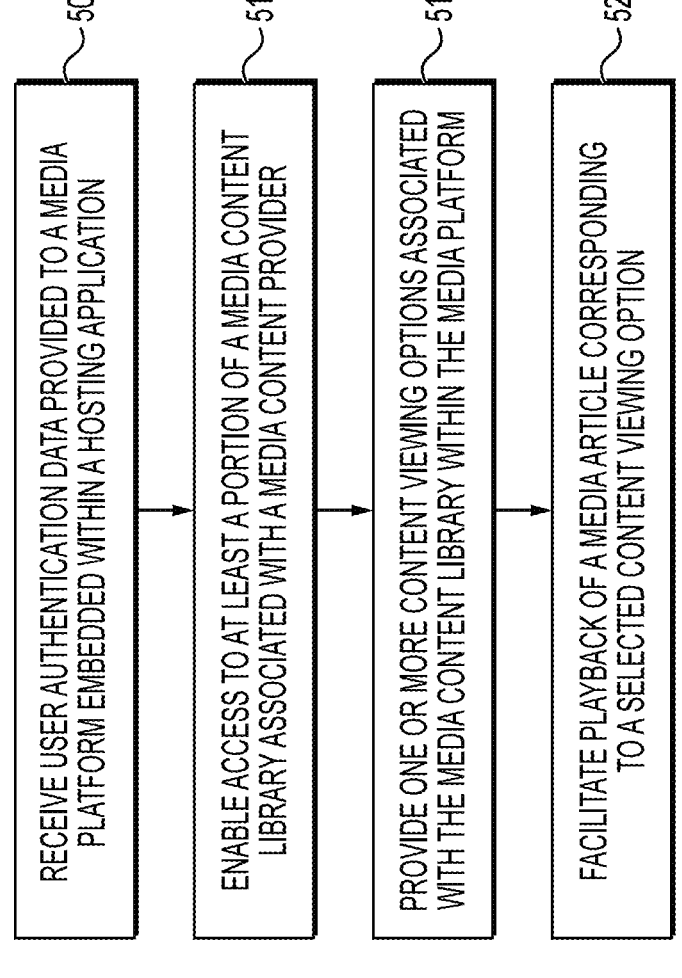

500

505 — RECEIVE USER AUTHENTICATION DATA PROVIDED TO A MEDIA PLATFORM EMBEDDED WITHIN A HOSTING APPLICATION

510 — ENABLE ACCESS TO AT LEAST A PORTION OF A MEDIA CONTENT LIBRARY ASSOCIATED WITH A MEDIA CONTENT PROVIDER

515 — PROVIDE ONE OR MORE CONTENT VIEWING OPTIONS ASSOCIATED WITH THE MEDIA CONTENT LIBRARY WITHIN THE MEDIA PLATFORM

520 — FACILITATE PLAYBACK OF A MEDIA ARTICLE CORRESPONDING TO A SELECTED CONTENT VIEWING OPTION

*FIG. 5*

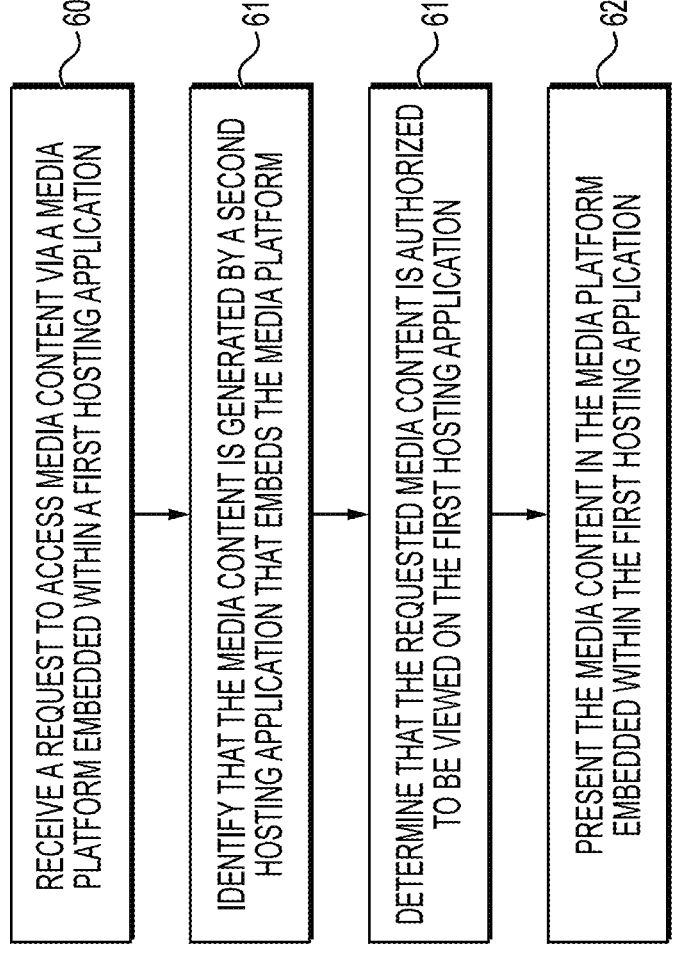

605

RECEIVE A REQUEST TO ACCESS MEDIA CONTENT VIA A MEDIA PLATFORM EMBEDDED WITHIN A FIRST HOSTING APPLICATION

610

IDENTIFY THAT THE MEDIA CONTENT IS GENERATED BY A SECOND HOSTING APPLICATION THAT EMBEDS THE MEDIA PLATFORM

615

DETERMINE THAT THE REQUESTED MEDIA CONTENT IS AUTHORIZED TO BE VIEWED ON THE FIRST HOSTING APPLICATION

620

PRESENT THE MEDIA CONTENT IN THE MEDIA PLATFORM EMBEDDED WITHIN THE FIRST HOSTING APPLICATION

SYSTEMS AND METHODS FOR EMBEDDING MEDIA IN A THIRD-PARTY APPLICATION

TECHNICAL FIELD

Various embodiments of the present disclosure relate generally to the field of digital media distribution and online content delivery, and, more particularly, to systems and methods that integrate Over-the-Top (OTT) solutions within third-party websites to enhance user engagement with media content.

BACKGROUND

In the evolving landscape of digital media distribution, Over-the-Top (OTT) solutions have emerged as a prominent method for delivering high-quality video content directly to consumers over the internet, bypassing traditional cable or satellite television providers. These OTT platforms offer flexibility and convenience, allowing users to access a diverse array of on-demand and live streaming content on various devices, including smartphones, tablets, smart TVs, computers, and the like. However, traditional OTT solutions typically require users to access content through dedicated platforms or applications, limiting the reach and integration possibilities with third-party websites. The present disclosure is accordingly directed to a most robust and versatile approach to embedding OTT solutions within third-party websites.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for embedding a comprehensive OTT solution within a third-party website.

In one aspect, a computer-implemented is provided. The computer-implemented method may include operations including: receiving, at a server, user authentication data provided to a media platform embedded within a hosting application; enabling, using a processor associated with the server and upon verifying the user authentication data, access to at least a portion of a media content library associated with a media content provider; providing, within the media platform, one or more content viewing options associated with the media content library; and facilitating, responsive to receiving selection of the one or more content viewing options, playback of a media article corresponding to the one or more content viewing options within the media platform on the hosting application.

In another aspect, a system is provided. The system may include: a memory including instructions; at least one processor configured to execute the instructions to perform operations comprising: receiving user authentication data provided to a media platform embedded within a hosting application; enabling access to at least a portion of a media content library associated with a media content provider upon verifying the user authentication data; providing one or more content viewing options associated with the media content library within the media platform; and facilitating, responsive to receiving selection of the one or more content viewing options, playback of a media article corresponding to the one or more content viewing options within the media platform on the hosting application.

In yet another aspect, a computer-implemented method is provided. The computer-implemented method may include operations including: receiving, at a media platform embedded within a first hosting application, a request to access media content; identifying, at a server, that the media content is generated by a second hosting application that also embeds the media platform; determining, using a processor associated with the server, that the media content generated by the second hosting application is authorized to be viewed on the first hosting application; and presenting, in the media platform embedded within the first hosting application, the media content It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1 depicts a first exemplary system infrastructure for an embedded media platform within a hosting application, according to one or more embodiments of the present disclosure.

FIG. 5 depicts an exemplary flowchart of a method for enabling access to media content via a media platform embedded in a hosting application, according to one or more embodiments of the present disclosure.

FIG. 6 depicts an exemplary flowchart of a method for enabling access to media content via a media platform embedded in two hosting applications, according to one or more embodiments of the present disclosure.

DETAILED DESCRIPTION OF EMBODIMENTS

Figure 2:
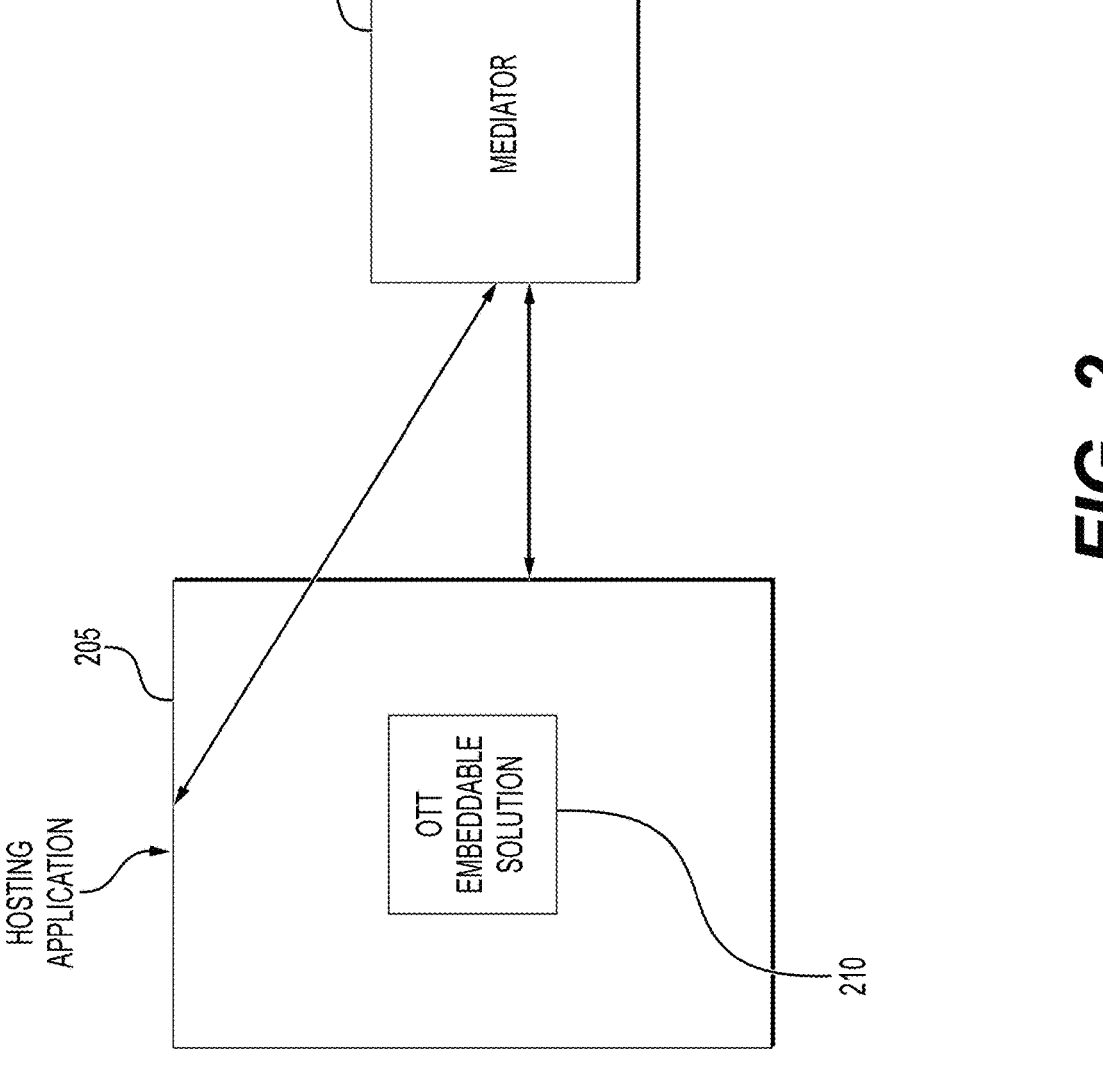
FIG. 2 depicts a second exemplary system infrastructure for an embedded media platform within a hosting application, according to one or more embodiments of the present disclosure.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of +10% of a stated or understood value.

The term "user", "subscriber," and the like generally encompasses consumers who are subscribed to a streaming service (e.g., streaming platform) associated with the system described herein. The term "streaming service" (e.g., streaming platform) may refer to subscription-based video-on-demand (SVOD) services such as television shows, films, documentaries, and the like. The term "user" may be used interchangeably with "user profile," "profile," and the like throughout this application. The phrase "registered with" may be used interchangeably with "subscribed to" and the like throughout this application. The phrase "multimedia content" may be used interchangeably with "multimedia content item", "article of multimedia content", and the like throughout this application.

OTT solutions refer to platforms or services that deliver video content over the internet, bypassing traditional cable or satellite television providers. Conventionally implemented OTT solutions typically involve standalone applications or websites where users can access a wide range of on-demand and live streaming content on various devices. These platforms often require users to subscribe to a service, either through a monthly subscription or pay-per-view model, to access premium content.

While OTT solutions have revolutionized the way consumers access and consume media, the challenge of effectively integrating OTT solutions within third-party websites has persisted, limiting the potential for seamless user experiences and optimized content promotion strategies. Conventional attempts to address this challenge have primarily relied on either content licensing agreements or redirection mechanisms, both of which present significant drawbacks in terms of user engagement, brand consistency, and revenue generation. More particularly, licensing agreements often entail complex negotiations and financial arrangements between content providers and hosting entities, resulting in limited flexibility and scalability for smaller content creators or emerging platforms. Additionally, such agreements may impose restrictions on the types of content that can be embedded, hindering the ability of hosting websites to curate diverse and engaging content libraries for their audiences. Furthermore, redirection mechanisms, e.g., where users are redirected to separate OTT platforms for content consumption, disrupt the user experience and may create fragmentation across digital ecosystems. Specifically, this approach fails to capitalize on the inherent traffic and audience engagement of third-party websites, missing opportunities for content discovery, subscription conversions, and revenue generation. Moreover, existing OTT embedding solutions typically focus on playback functionality, lacking comprehensive browsing, subscription, and payment features within the embedded environment. These limitations restrict the ability of content providers to fully leverage third-party websites for content promotion during live events or other high-traffic scenarios, where users may be more inclined to discover and engage with new content offerings.

To address the above-noted problems, the present disclosure describes systems and methods that provide a more robust and versatile approach to embedding OTT solutions within third-party websites. More particularly, the concepts described herein seamlessly integrate browsing, subscription, payment, and playback functionalities while maintaining brand consistency. Additionally, the described concepts enable bidirectional communication between the embedded solution and one or more hosting applications. These innovative concepts would not only enhance user experiences, but would also unlock new collaboration opportunities for content providers and hosting entities alike.

The systems and methods described herein represent a variety of technical improvements to computer technology. For instance, the concepts described herein facilitate seamless embedding of a comprehensive OTT experience directly within third-party websites, eliminating the need for redirection mechanisms. This streamlined integration enhances user experiences by allowing users to access browsing, subscription, payment, and playback functionalities without navigating away from the host site. Additionally, the novel concepts enable bidirectional communication between the embedded OTT solution and the hosting application, facilitating dynamic content delivery, personalized recommendations, and real-time analytics insights. This communication enhances user engagement by enabling tailored content experiences and optimizing content promotion strategies based on user behavior and preferences. Furthermore, the concepts described herein enable federation of content and subscribers across multiple hosting entities, facilitating seamless content sharing and revenue attribution. This capability expands collaboration opportunities among content providers and hosting websites, maximizing content reach and revenue generation potential. Lastly, the invention offers advanced content curation and prioritization algorithms based on contextual relevance, user preferences, and thematic focus. This functionality ensures that users are presented with curated content experiences tailored to their interests, increasing engagement, and satisfaction.

Although the subject matter disclosed herein is generally described with reference to streamed live broadcasts (e.g., sporting events, concerts, etc.), it is important to note that these designations are not limiting. More particularly, some or all of the embodiments that are subsequently described may be applicable to other types of digital media (e.g., pre-recorded media content such as shows, movies, etc.).

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

FIG. 1 depicts an exemplary system 100 in which there is a direct communication between a hosting application 105 and an OTT solution 110 embedded within the hosting application 105. This embodiment involves a direct exchange of data and commands between the two entities without the involvement of any intermediary components. Additionally, this direct communication pathway facilitates faster data transmission and allows for substantially real-time interaction between the hosting application and the embeddable OTT solution.

Hosting application 105, which may also be referred to herein as a "third-party website" or "platform," may be a web-based or mobile platform that hosts the embeddable OTT solution 110, thereby enabling users to interact with OTT functionalities without leaving the hosting application's interface. In an embodiment, the hosting application may serve as the primary interface through which users access various features, services, and content. It may be a website, mobile application, or any other digital platform that users visit to browse and/or interact with digital content. Additionally, the hosting application may host its own content alongside the embeddable OTT solution. This content may include articles, videos, images, forums, social features, or any other relevant material tailored to the platform's target audience. By integrating the embeddable OTT solution (e.g., via techniques further described herein), the hosting application may enhance user engagement by providing additional entertainment options and premium content without redirecting users to external platforms. Furthermore, one or more visual elements of embeddable OTT solution may be dynamically adjusted to align with one or more characteristics of the hosting application, such as branding, design characteristics (e.g., color scheme, graphic size, graphic nature, etc.), content type, and the like. This may involve adjusting colors, fonts, layout, and/or other visual elements to create a cohesive and consistent user interface across the platform and hosting application. Users may interact with the embeddable OTT solution directly within the hosting application's interface. For instance, they can browse, search subscribe, purchase, and consume premium content without being redirected to external OTT platforms or websites.

The embeddable OTT solution 110 may be a comprehensive platform that offers various types of OTT services. This solution is designed to be embedded within the user interface of the hosting application, allowing users to access OTT content without leaving the hosting environment. In an embodiment, the embeddable OTT solution may be configured to provide a wide range of functionalities aimed at delivering a seamless and immersive viewing experience. These functionalities may include, but are not limited to: content browsing (e.g., users may explore a catalog of premium content, including movies, TV shows, live events, and original programming), subscription management (e.g., users may subscribe to various subscription plans, manage their account preferences, renew or cancel subscriptions as needed, etc.), payment processing (e.g., the OTT solution facilitates secure payment transactions, allowing users to purchase subscription plans or individual pieces of content using various payment methods), playback (e.g., users may stream or download content for offline viewing), personalized recommendations (e.g., the platform may leverage user preferences, viewing history, and behavioral data on the hosting application to provide personalized content recommendations from the OTT content library, enhancing user engagement and satisfaction), and the like. Additionally, the OTT solution may be customizable to align with branding, design guidelines, and user experience standards of the hosting website or application, as further described herein.

In system 100, the direct communication channel between the hosting application and the embeddable OTT solution may be established using application programming interfaces (APIs), webhooks, HTTP requests, or similar communication protocols. Once the connection is established, various types of data may be exchanged seamlessly between the two entities without the need for intermediary components. For instance, exemplary data types may include, but are not limited to: metadata (e.g., information about the content available on the OTT platform, such as titles, descriptions, genres, ratings, release dates, and associated images or thumbnails), user actions (e.g., user interactions with the OTT features, including browsing history, search queries, watchlists, subscriptions, purchases, playback progress, and user preferences), authentication data (e.g., user authentication credentials, session tokens, and access permissions to verify user identify and grant access to premium content), configuration settings (e.g., customization options, preferences, and settings defined by the hosting application or the user, such as language preferences, parental controls, and playback quality settings).

In an embodiment, the data exchanged between the hosting application and the embeddable OTT solution may be structured using standard formats such as JavaScript Object Notation (JSON) or extensible Markup Language (XML). These formats allow for easy parsing, manipulation, and interpretation of data by both entities. In an embodiment, the data exchange may follow a request-response model, wherein the hosting application sends commands or requests to the embeddable OTT solution based on user interactions, system events, or other triggers. These commands may include requests for data, instructions to perform specific actions, or updates to configuration settings. Once generated, the commands may be transmitted from the hosting application to the embeddable OTT solution over the direct communication channel (e.g., using one of the aforementioned communication protocols that are supported by both entities). Upon receiving the commands, the embeddable OTT solution may process them to determine the appropriate actions to take or responses to generate. This may involve querying the system for the relevant data, executing business logic, updating internal state, or initiating external interactions. Exemplary actions that the OTT solution may perform in response to commands may include: retrieving content (e.g., fetching metadata or media files from the OTT platform's database or content delivery network), user authentication (e.g., verifying user credentials, validating session tokens, and granting access to premium content), subscription management (e.g., activating, renewing, or cancelling subscriptions based on user requests), and playback control (e.g., starting, pausing, resuming, or stopping video playback based on user interactions).

After executing the requested actions or processing the commands, the embeddable OTT solution may generate responses to send back to the hosting application. These responses may include: data payloads (e.g., sending requested data, such as content metadata, user information, or system status updates, back to the hosting application), confirmation messages (e.g., acknowledging successful execution of commands or actions and providing status updates or error messages as needed, etc.), event notifications (e.g., information the hosting application of significant events or changes in system state, such as content availability, subscription renewals, or playback interruptions), and the like. Finally, the responses generated by the embeddable OTT solution may be transmitted back to the hosting application over the direct communication channel. The hosting application then processes these responses to update its user interface, handle user interactions, or trigger further actions as necessary.

In an embodiment, the data exchange may occur in real-time or substantially real-time, allowing for immediate updates and synchronization between the hosting application and the embeddable OTT solution. This may ensure that changes made in one platform are reflected immediately in the other, thereby providing a seamless and responsive user experience. Additionally, in an embodiment, the data exchange process may be designed to be scalable and performant, capable of handling a large volume of data and requests efficiently. This ensures that the hosting application and the embeddable OTT solution may operate seamlessly even under high traffic conditions. Furthermore, to ensure the security and integrity of data exchanged over the direct communication channel, one or more encryption protocols, authentication mechanisms, and/or access control policies may be implemented. The foregoing may help prevent unauthorized access, data breaches, and other security threats.

Referring now to FIG. 2, an exemplary system 200 is provided in which a third-party component (a "mediator" component) 215 may be present that is configured to route the data between the hosting application 205 and the embeddable OTT solution 210. More particularly, the mediator component 215 may act as an intermediary entity that facilitates communication and coordination between the hosting application 205 and the OTT solution 210, configured to streamline data exchange, enhance interoperability, and ensure secure interactions between those two entities. The hosting application 205 and the embeddable OTT solution 210 in system 200 may retain the features and functionality previously described with reference to system 100.

In an embodiment, mediator component 215 may serve as a central hub through which data flows between the hosting application 205 and the OTT embeddable solution 210. In this role, mediator component 215 may be configured to intercept data transmissions between the hosting application 205 and the OTT embeddable solution 210, e.g., at various points within the communication channel, allowing mediator component 215 to capture incoming and outgoing data packets. Once data packets are intercepted, mediator component 215 may identify the relevant information contained within them. This includes user interactions, content preferences, authentication credentials, subscription details, playback commands, and any other data pertinent to the functioning of the embedded OTT solution. After identifying the relevant data, mediator component 215 may be configured to route that data to the appropriate recipient, e.g., either the hosting application 205 or the OTT embeddable solution 210. This routing process ensures that data reaches its intended destination in a timely and efficient manner.

In an embodiment, mediator component 215 may be designed to optimize the flow of data between the hosting application 205 and the OTT embeddable solution 210 to minimize latency, reduce bottlenecks, and maximize throughput. For instance, in some cases, the hosting application 205 and the OTT solution 210 may use different communication protocols or data formats. Mediator component 215 may be configured to perform data transformation or protocol conversion to facilitate interoperability between these disparate systems, ensuring that that data exchanged between the two entities 205, 210 remains compatible and understandable. With respect to data transformation, mediator component 215 may standardize the format data exchanged between the hosting application 205 and the OTT embeddable solution 210 (e.g., via converting data into a common format, such as JSON or XML). With respect to protocol conversion, mediator component 215 may translate between different communication protocols, such as HTTP, WebSockets, or custom APIs, to enable smooth communication between disparate systems.

In the event of data transmission errors or network disruptions, mediator component 215 may be configured to handle error recovery and ensure data integrity. For instance, mediator component 215 may implement error correction protocols, retransmit lost data packets, or initiate failover mechanisms to maintain continuity of communication. In an embodiment, throughout the data routing and mediation process, mediator component 215 may be configured to continuously monitor the flow of data and/or log relevant information for auditing and troubleshooting purposes. This monitoring enables real-time visibility into data exchange activities, allowing the mediator to detect anomalies, track performance metrics, and identify potential issues proactively. In an embodiment, mediator component 215 may further be configured to implement robust security measures to protect sensitive information and prevent unauthorized access. This includes encryption of data transmissions, implementation of secure authentication protocols, and enforcement of access controls.

A list of non-limiting example use cases are provided below that may occur using either system 100, configured for direction communication between the hosting application and the OTT solution, or system 200, in which a third-party component is utilized to act as a mediator between the hosting application and the OTT solution.

In one exemplary use case, a user may be browsing a sports-based hosting application, which features news articles, highlights, and analysis related to various sports events and competitions. The hosting application embeds an OTT media player to provide users with access to additional multimedia content, such as live streams, replays, and documentaries. However, to maintain thematic consistency, the OTT solution restricts access to sports-related content only. To implement this configuration, the hosting application may periodically send indications of the content presented on its platform to the server of the content provider associated with the OTT solution. This indication may include metadata associated with icons, headlines, or other elements displayed on the hosting application. Upon receiving indications of the content presented on the hosting application, the server associated with the content provider analyzes this information to identify related media content stored in its database. It uses various matching algorithms and contextual analysis techniques to determine the thematic relevance of the content. Once relevant media content is identified, the server of the content provider communicates with the embedded OTT solution to provide a curated selection of media content that aligns with the thematic focus of the hosting application.

In another exemplary use case, a user may be a subscriber/member of a hosting application that may contain an embedded OTT media player. The hosting application may collect user data through various channels, including user registrations, account settings, viewing history, user interactions, surveys, and feedback. User data may include demographic information (e.g., age, gender, location, etc.), viewing preferences (e.g., favorite genres, watched titles, ratings, viewing length, etc.), subscription status, engagement metrics, and other relevant characteristics. The hosting application may communicate with the server associated with the embedded media player (e.g., the server of a media content provider, etc.), transmitting the collected user data. Given available permissions, the server may utilize this information to select and personalize the content offerings and recommendations provided on the OTT media player that are tailored to the user's preferences and characteristics. For example, the hosting application may be sports-related and may identify that a user checks tennis scores each time they visit the application. The hosting application may provide an indication of this identification to the OTT solution and, in response, the OTT solution may generate a list of available tennis-related media content that the user may access.

In yet another exemplary use case, and using the general fact pattern associated with the previous use case, the hosting application may transmit all collected user data to a mediator component that connects the OTT media player with the hosting application. The mediator component may act as a data store for the hosting application and/or act as an intelligent intermediary between the hosting application and the OTT solution. More particularly, data processing (e.g., viewing preference determination) may occur at the mediator component rather than at the hosting application or at the server associated with the OTT media player. The mediator component may then provide an indication to the OTT server of the content it determines that the user would like to see and/or is appropriate for the user to see and may subsequently relay the received content back to the hosting application.

Figure 3:
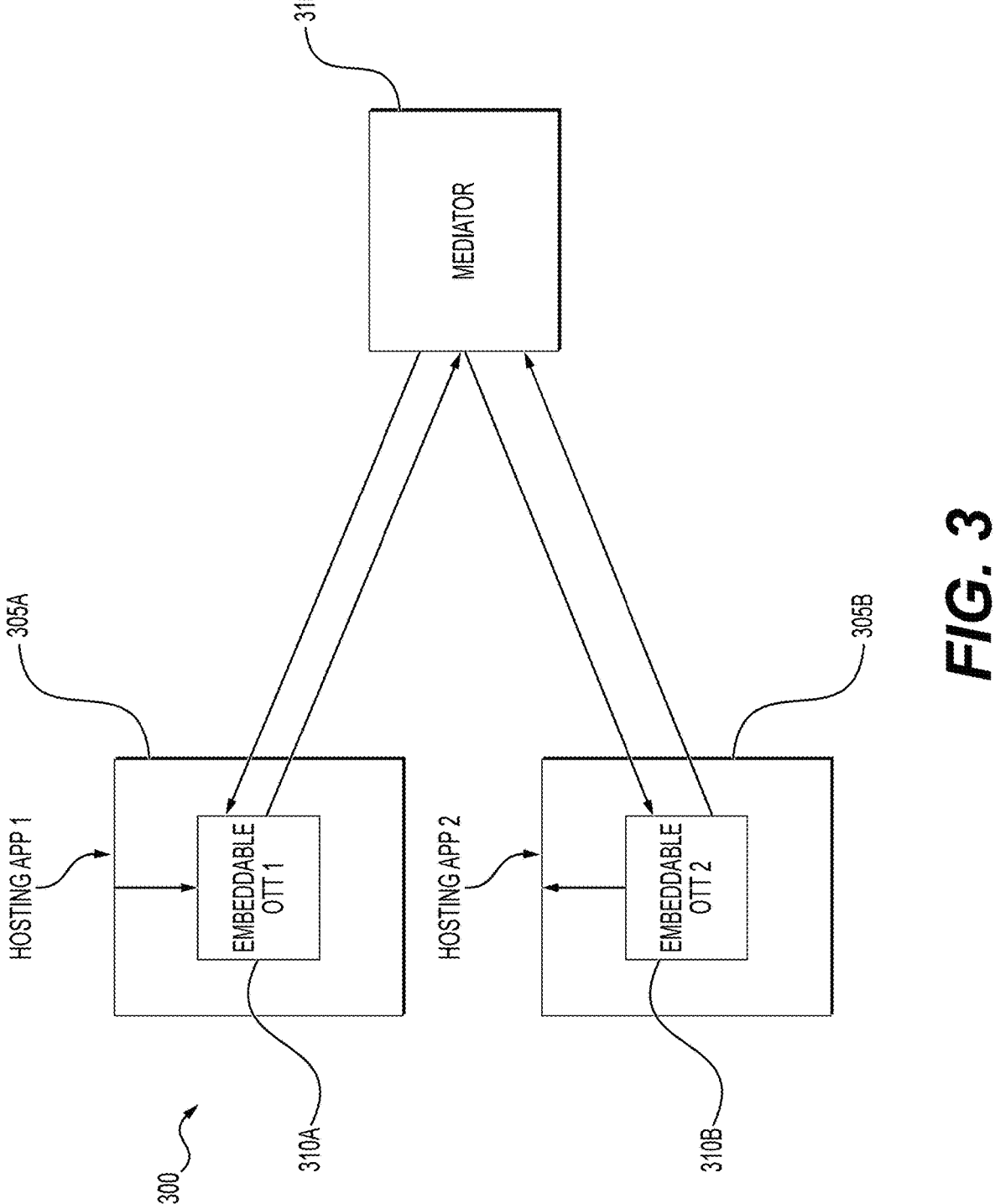
FIG. 3 depicts a third exemplary system infrastructure for an embedded media platform within two hosting applications, according to one or more embodiments of the present disclosure.

Referring now to FIG. 3, exemplary system 300 is illustrated in which multiple hosting entities, 305A and 305B, are present, each integrating the OTT embeddable solution, 310A and 310B, into their respective digital properties. This structure enables content sharing, attribution, and revenue management across different hosting entities. In this configuration, a mediator component 315 may be included that is configured to intercept data exchanges between the hosting entities and the OTT embeddable solution, serving as a central hub for communication. In an embodiment, each hosting entity may provide content to the OTT embeddable solution within their digital property. This content may include videos, articles, live streams, or other multimedia assets. The OTT embeddable solution aggregates content from the hosting entities, creating a unified platform that users may utilize to access a wide range of content that may conventionally be unavailable to either hosting entity alone.

Mediator component 315 may contain all of the capabilities and functionality previously described with respect to mediator component 215. Additionally, mediator component 315 further facilitates collaborative content management between the hosting entities, enabling them to share resources, promotional materials, and editorial content. More particularly, system 300 may enable users to access content from various hosting applications using a single set of credentials. Rather than requiring users to create separate accounts for each hosting platform, the OTT solution enables them to log in once (e.g., on either hosting entity 305A or 305B) and thereafter access content across all integrated entities assuming that they also have a subscription with the embedded OTT solution. This unified login experience enhances user convenience and streamlines the authentication process. Once authenticated, subscribers to either hosting application may gain access to a broader range of content available across the different hosting applications. For example, a user who subscribes to a particular OTT service through one hosting website may seamlessly access content from other partnering websites without the need for additional logins and without the need to take additional steps to visit those websites. This cross-property content consumption enriches the user experience and encourages continued engagement with the embedded OTT solution.

Mediator component 315 may additionally be configured to enable real-time communication and monitoring of data exchanges between the hosting entities and the OTT solution. It continuously monitors data flows, tracks user interactions, and logs revenue-related activities. Additionally, mediator component 315 ensures data security and compliance with industry regulations and standards throughout the data exchange process. Furthermore, mediator component 315 may act as a gatekeeper to content, ensuring that only authorized users and/or authorized entities are able to access certain types of requested content.

In some embodiments, system 300 may be configured to perform revenue attribution and compensation allocation. Specifically, revenue attribution may involve tracking and assigning monetary value to various activities within the OTT ecosystem, such as subscriber sign-ups, subscription renewals, content consumption, and advertising interactions. Each subscriber action is logged and associated with metadata identifying the hosting entity and content accessed. This metadata enables precise attribution of revenue to content providers, hosting entities, and advertising partners. In an embodiment, the OTT solution may track subscriber actions (e.g., subscriber sign-ups, subscription renewals, payment transactions, etc.) and associate them with metadata identifying the hosting entity and content accessed. In another embodiment, viewing metrics (e.g., the number of views, duration of viewing sessions, user engagement during the viewing session, etc.) may be monitored to assess content popularity and audience behavior. This data may help attribute revenue to specific content and hosting entities. In another embodiment, for ad-supported models, impressions, clicks, conversions, and other advertising interactions may be tracked to measure ad effectiveness and revenue generation, which is then attributed based on the hosting entity's involvement in delivering and monetizing ad content.

In a first non-limiting example, a user may be browsing a sports-focused hosting application, e.g., Application A that is associated with a first media content provider, which primarily features content related to various sports events and competitions. The user may be interested in watching a track and field video, which is not available in the first media content provider's library, but is, however, available in another application, e.g., Application B that is associated with a second media content provider, specializing in track and field content. Although Application A does not host track and field videos, it may utilize the OTT embeddable solution to fulfill a user's request to watch those videos. More particularly, the request from Application A to access the track and field video may be routed through the mediator component, which may verify that Application A is an authorized application to receive content from Application B and/or that the user is authorized to receive content from Application B (e.g., by virtue of being a subscriber to Application A). Upon confirming authorization, the mediator component may proceed to retrieve the requested track and field video from Application B's content library. With authorization confirmed, the mediator component may deliver the track and field video from Application B's library to the user through the OTT embeddable solution integrated in Application A. Thereafter, the user can seamlessly watch the track and field video within Application A's interface, even though the video originated from Application B.

In a second non-limiting example, during the Olympic Games, Media Network A and Media Network B may collaborate to provide comprehensive coverage of various sporting events to their respective audiences. More particularly, Media Networks A and B may both provide live streams, highlights, interviews, and analysis of Olympic events through their digital platforms. A user may visit Network A's website to watch live coverage of the swimming events during the Olympic Games. Using the OTT embeddable solution integrated into Network A's platform, the user access a curated selection of live streams, highlights, and interviews provided by both media networks. As the user watches live swimming coverage, they may be able to see athlete profiles, event schedule, and real-time updates on medal standings sourced from both networks. During commercial breaks, the user may view targeted ads served by the OTT embeddable solution, with revenue shared between both networks based on advertisement views and user engagement. After the event, the user may access on-demand content such as race replays and post-event analysis, seamlessly provided by both networks through the federated OTT platform.

Figure 4A:
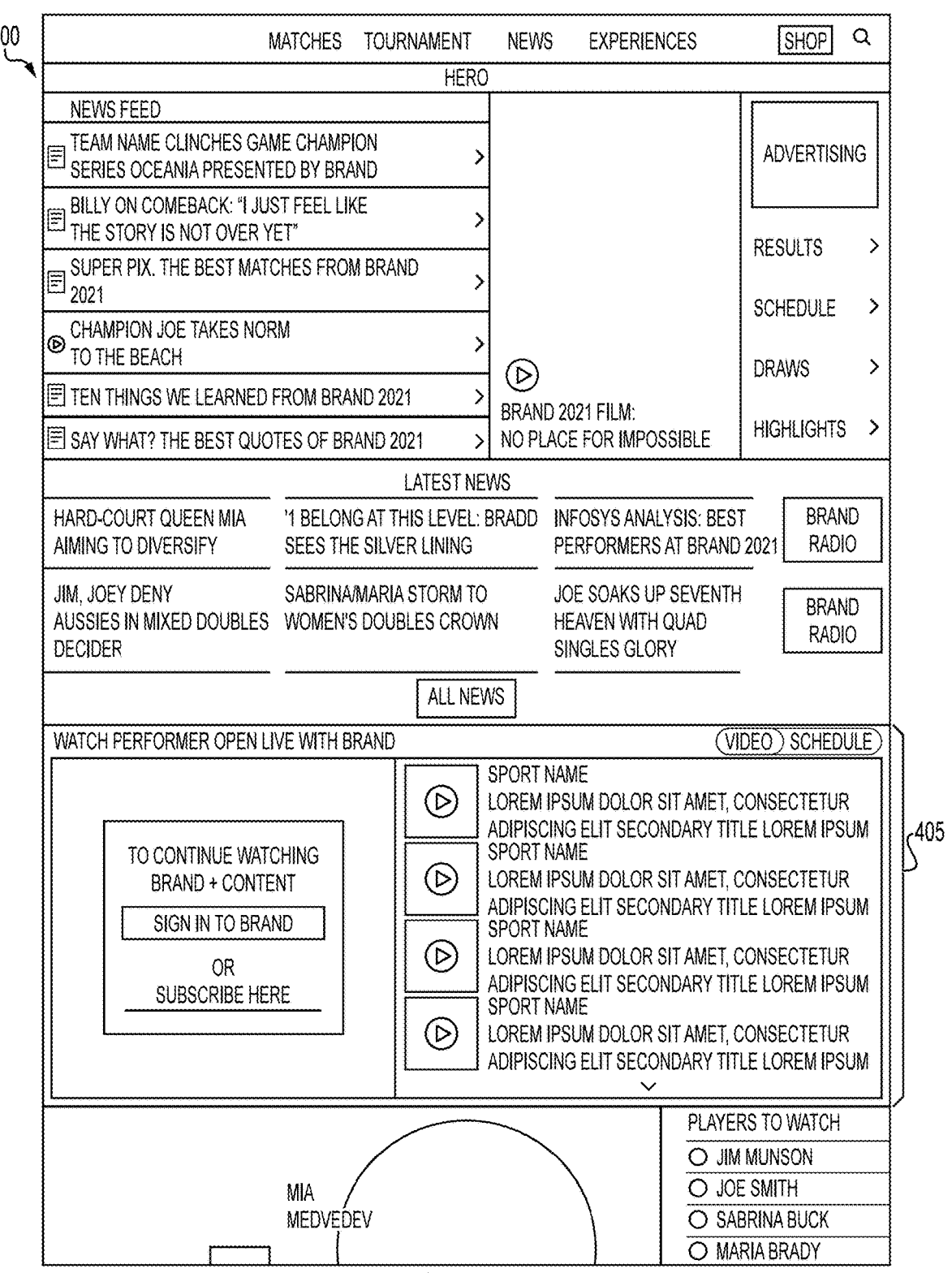
FIGS. 4A and 4B collectively depict an exemplary user interface of a hosting application embedding a media platform, according to one or more embodiments of the present disclosure.
Figure 4B:
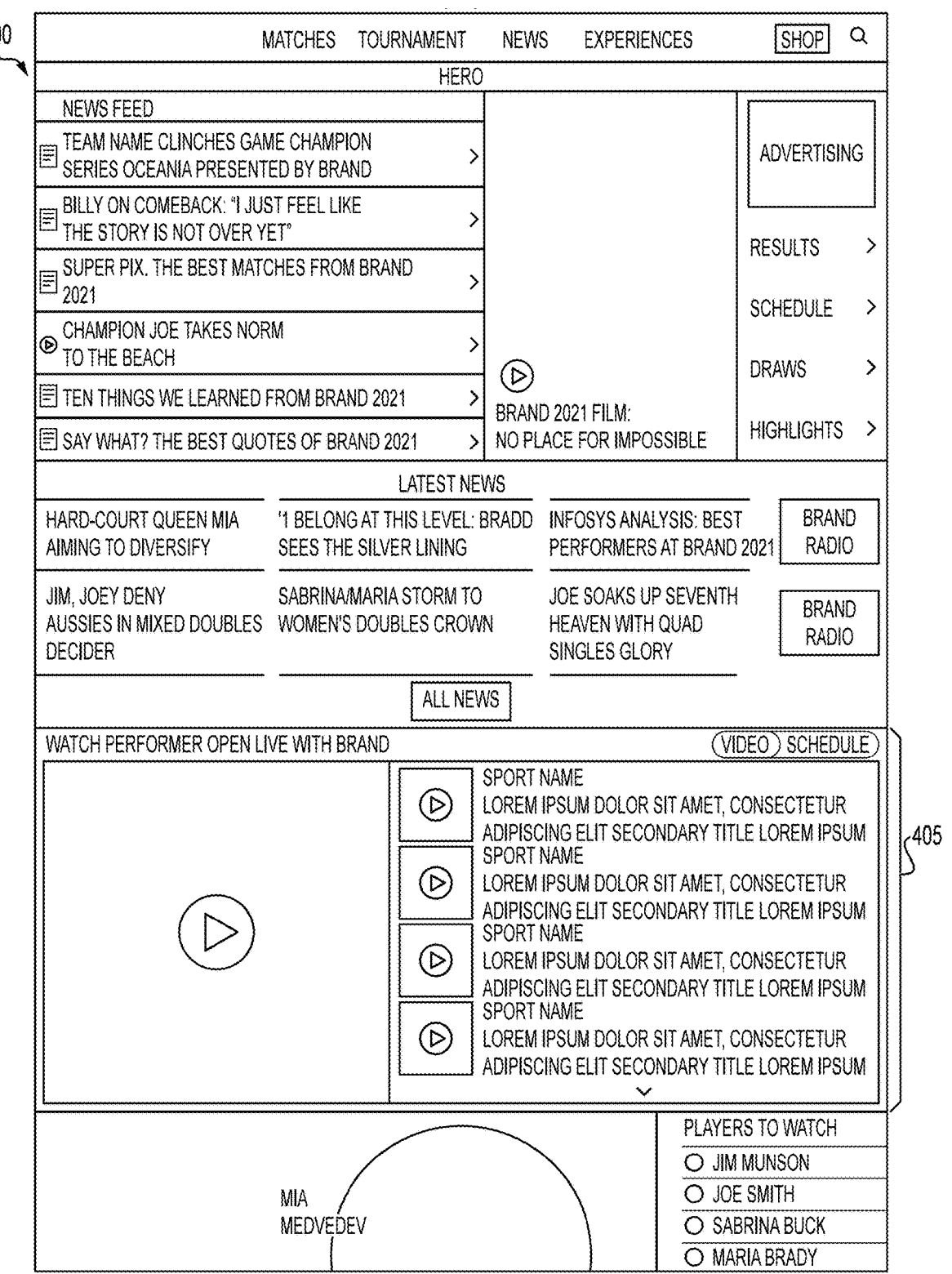

Referring now collectively to FIGS. 4A and 4B, an exemplary hosting application 400 is depicted containing an embedded OTT solution 405. The embedded OTT solution 405 may be placed virtually anywhere in the hosting application 410 and may enable users to interact directly with media content provided by the media content provider associated with the embedded OTT solution 405. In FIG. 4A, a user may interact with a log in screen 410 contained within the embedded OTT solution 405 to provide their credentials to sign into their account associated with the media content provider. Upon approval, the user may have access to the full, or curated list, of media content provided by the media content provider directly within the embedded OTT solution 405, as shown in FIG. 4B.

Referring now to FIG. 5, an exemplary process flow 500 for enabling access to a media article is provided, according to one or more embodiments of the present disclosure. Exemplary process flow 500 may be implemented by system environments 100, 200, or 300.

At step 505, user authentication data may be received at a server associated with a media content provider. More particularly, when a user attempts to access the media platform embedded within the hosting application, they may be prompted to provide authentication data. This initiation may occur, for example, when the user clicks on a login or sign-in button within the embedded media platform interface. Upon initiation, the user may be presented with a login form or authentication prompt where they may input their credentials. These credentials may include a username or email address and a corresponding password. In some embodiments, the user may also have the option to use alternative authentication methods such as social media login or single sign-on (SSO) if supported.

Once the user inputs their credentials, they may be transmitted securely over the internet to the server hosting the fully embeddable OTT solution. This transmission may occur via HTTPS protocol or another secure communication channel to protect the confidentiality of the user's authentication data. Upon receipt, the server may validate the received credentials to ensure they are in the correct format and may also verify the authenticity of the provided credentials by comparing them against stored user records or a centralized authentication database. Based on the results of the verification process, the server may determine whether the provided credentials match those associated with a valid user account within the system. If the credentials are authenticated successfully, the user may be granted access to the media platform and its associated features. Otherwise, access may be denied, and appropriate error messages or prompts may be displayed to the user. Throughout the foregoing authentication process, the server may employ robust security measures to safeguard the confidentiality and integrity of the user's authentication data. This may include encryption of transmitted data, secure storage of user credentials, and adherence to industry best practices for handling sensitive information.

At step 510, the server may enable access to at least a portion of a media content library upon associated with a media content provider upon verifying the user authentication data. In this regard, the server may perform one or more authorization checks to determine the level of access the authenticated user is granted. This may involve checking the user's subscription status, membership level, or any other relevant access control policies defined by the media content provider and/or the hosting application. For example, with respect to the latter, the server may grant users access to a curated selection of content or media properties that are contextually associated with what is being presented on the hosting application or website. In some embodiments, this curation may be very granular, including limiting access to a subset of episodes or clips from different shows or categories, rather than just access to the entire platform or series.

Once the user's access privileges are determined, the server may retrieve relevant metadata or information about the accessible media content from the media content library. This may include titles, descriptions, categories, genres, and other attributes associated with the available media articles. The server may dynamically provision the accessible media content with the embedded media platform on the hosting application. This ensures that the user has immediate access to the available media content without the need for additional authentication or authorization checks during browsing or playback.

At step 515, the server may provide one or more content viewing options to the user via the embedded media platform on the hosting application. In an embodiment, prior to presenting viewing options to the user, the server may organize the available media content within the content library. This organization may be based on categories, genres, playlists, release dates, popularity, hosting application context, or any other relevant criteria. Thereafter, the server may present the organized media content to the user as viewing options within the embedded media platform's user interface. These viewing options may be displayed as thumbnails, titles, descriptions, or other visual elements that represent individual media articles or collections of content. To enhance browsing, the server may provide filtering and sorting options for the displayed content. Additionally or alternatively, the server may dynamically organize and sort the content based on context (e.g., the server may prioritize the media content most closely associated with content themes presented in the hosting application or most closely associated with a user's recent browsing criteria). For instance, the server may prioritize the content based on the percentage of content displayed on the hosting application (e.g., if the hosting application predominately features cooking show content (60%), then the server may prioritize granting users access to cooking-related content in a similar proportion (e.g., 60% cooking content and 40% other content). In an embodiment, the server may incorporate personalized recommendations based on the user's viewing history, preferences, or behavior within the media platform. These recommendations may help users discover new content that aligns with their interests and viewing habits, thereby enhancing engagement and satisfaction.

At step 520, the server may facilitate playback of a media article responsive to receiving a user selection on one or more content viewing options. More particularly, upon receiving the user's selection, the server retrieves the corresponding media content from the media content library. This may involve fetching the video file, or other multimedia elements associated with the selected media article. Additionally, the server may prepare the content for playback by buffering, transcoding, or optimizing it for streaming. Once the media content is retrieved and prepared, the server initiates the playback process within the embedded media platform on the hosting application. This may involve launching a media player interface where the selected content will be displayed and played back to the user. In an embodiment, depending on the nature of the media content and user preferences, the server streams the content for real-time playback or allows the user to download it for offline viewing. In an embodiment, during playback, the server provides various playback controls within the embedded media platform's interface. These controls allow the user to pause, play, rewind, fast forward, adjust volume, and navigate through the content. Additionally, the server may offer options for captioning, audio language selection, and quality settings to enhance the viewing experience.

In some embodiments, the systems described above may enable users to seamlessly transition their media playback experience from one device to another, enabling them to pick up where they left off in the embedded media player on the hosting application. To facilitate this, the system may employ cross-device synchronization mechanisms to track the user's playback progress across different devices. When the user beings watching a media article on the embedded media player on the hosting application on the first device (e.g., their computer), the system records the current playback position along with the user's authentication data. The system may maintain a persistent session for the authenticated user, storing relevant session data such as playback progress, preferences, and user settings. This session data is securely stored on the server and associated with the user's account, allowing it to be accessed from any device with the hosting application installed. In an embodiment, each device running the hosting application may be assigned a unique identifier or token that is linked to the user's account. This identifier may allow the system to recognize and differentiate between multiple devices associated with the same user. Accordingly, when the user loads the hosting application on the second device (e.g., their phone), they are prompted to authenticate themselves using their credentials or other authentication methods. Once authenticated, the system retrieves the user's session data and playback progress from the server based on their unique device identifier. Upon successful authentication and retrieval of session data, the system may automatically resume playback of the media article from the point where the user left off on the first device. As the user continues watching the media article on the second device, the system may continuously synchronize the playback progress across all devices in real-time.

Referring now to FIG. 6, an exemplary process flow 600 for enabling access to a media article is provided, according to one or more embodiments of the present disclosure. Exemplary process flow 600 may be implemented by system environment 300.

At 605, a request may be received at a media platform embedded within a first hosting application to access media content. This request may originate from an interaction in which a user clicks on a link selecting a media playback option. Upon the user's interaction, a request to access the specific media content may be generated by the media platform within the first hosting application. This request may typically include metadata or identifiers associated with the requested media content. The request may then be transmitted from the client-side interface of the first hosting application to a server-side component of the media player (e.g., a server hosted on a media component). This transmission may occur over a network connection using standard communication protocols. Upon receiving the request at the server, the system initiates the process of handling and processing the request. This may involve routing the request to appropriate components or modules responsible for identifying and retrieving the requested media content. In some embodiments, the server may log and track incoming requests to access media content for monitoring, analytics, and auditing purposes. This helps maintain a record of user interactions and content access patterns, which can inform decision-making processes and improve the overall user experience.

At step 610, the server may identify that the media content is generated by a second hosting application that also embeds the media platform. In this regard, upon receiving the request to access media content, the server may initiate the process of identifying the origin of the requested media content. For instance, the server may analyze metadata associated with the requested media content. Metadata may include information such as the title, description, source URL, or unique identifiers (e.g., media ID) embedded within the request. The server may cross-reference the extracted metadata with known sources or databases that contain information about the media content and its origin. This may involve querying internal database, external content providers (e.g., other hosting applications that embed the OTT media platform), or metadata repositories to match the extracted metadata with known records. Based on the analysis of metadata and cross-referencing with known sources, the server may identify the source or origin of the requested media content. Specifically, this source identification process may determine which hosting application or platform generated the media content that is being requested for access. In cases where the origin of the media content cannot be accurately identified or validated, the server may handle errors or exceptions appropriately (e.g., by generating error messages, logging diagnostic information, or initiating fallback mechanisms to handle the request in an alternative manner). In an embodiment, once the source of the media content is identified, the server may verify and validate the authenticity of the source. This may involve checking for any digital signatures, authentication tokens, or other indicators of legitimacy associated with the identified source to ensure that the media content originates from a trusted and authorized platform.

At step 615, the server may determine that the media content generated by the second hosting application is authorized to be viewed on the first hosting application. This determination may be facilitated by the server evaluating the access control policies associated with the requested media content. These policies may dictate which users or user roles are authorized to view the content and under what conditions. In an embodiment, the server may additionally ensure that the user requesting access to the media content is authenticated. This may involve validating the user's credentials, session tokens, or authentication tokens to confirm their identify and establish their level of access. Once the user is authenticated, the server may perform authorization checks to determine whether the user has the necessary permissions to view the requested media content. This may involve comparing the user's access credentials and permissions against the access control policies associated with the content.

In cases where the requested media content is subject to licensing agreements or digital rights management (DRM) restrictions, the server may verify that the user's access complies with these legal and contractual obligations. This may involve checking subscription status, license expiration dates, and/or other DRM-related constraints. In an embodiment, depending on the context in which the media content is being accessed, the server may apply additional authorization criteria. For example, if the media content is embedded within a paid subscription service associated with the second hosting application, the server may require users to have an active subscription or premium membership to access the content. In some instances, the requested content may be temporarily enabled, but may otherwise be placed behind a paywall. For example, certain content originating on the second hosting application may be temporarily available for consumption by a user utilizing the first hosting application (e.g., for a predefined period of time, until the conclusion of a specific event, etc.).

At step 620, the requested content may be presented to the user on the media platform embedded within the first hosting application. In this regard, once the server determines that the requested media content is authorized for viewing within the first hosting application by the user, it may proceed to present the content within the embedded media platform's interface. This may involve dynamically loading the media file, buffering data for smooth playback, and/or optimizing the content presentation based on the user's device capabilities and network conditions. In an embodiment, the media platform may include various player controls (e.g., playback controls such as play, pause, stop, rewind, fast forward, volume adjustment, etc.), quality settings (e.g., options for selecting different video resolutions, streaming protocols, subtitle/captions, etc.), interactive features (e.g., options for liking, sharing, commenting, bookmarking, etc.), and the like.

In general, any process discussed in this disclosure that is understood to be computer-implementable, such as the processes illustrated in FIGS. 5 and 6, may be performed by one or more processors of a computer system, such as computer systems 100, 200, and 300 described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such computer systems 100, 200, and 300, may include one or more computing devices. If the one or more processors of the computer systems are implemented as a plurality of processors, the plurality of processors may be included in a single computing device or distributed among a plurality of computing devices. If any of computer systems 100, 200, or 300 comprises a plurality of computing devices, the memory of the computer systems 100, 200, or 300 may include the respective memory of each computing device of the plurality of computing devices.

Figure 7:
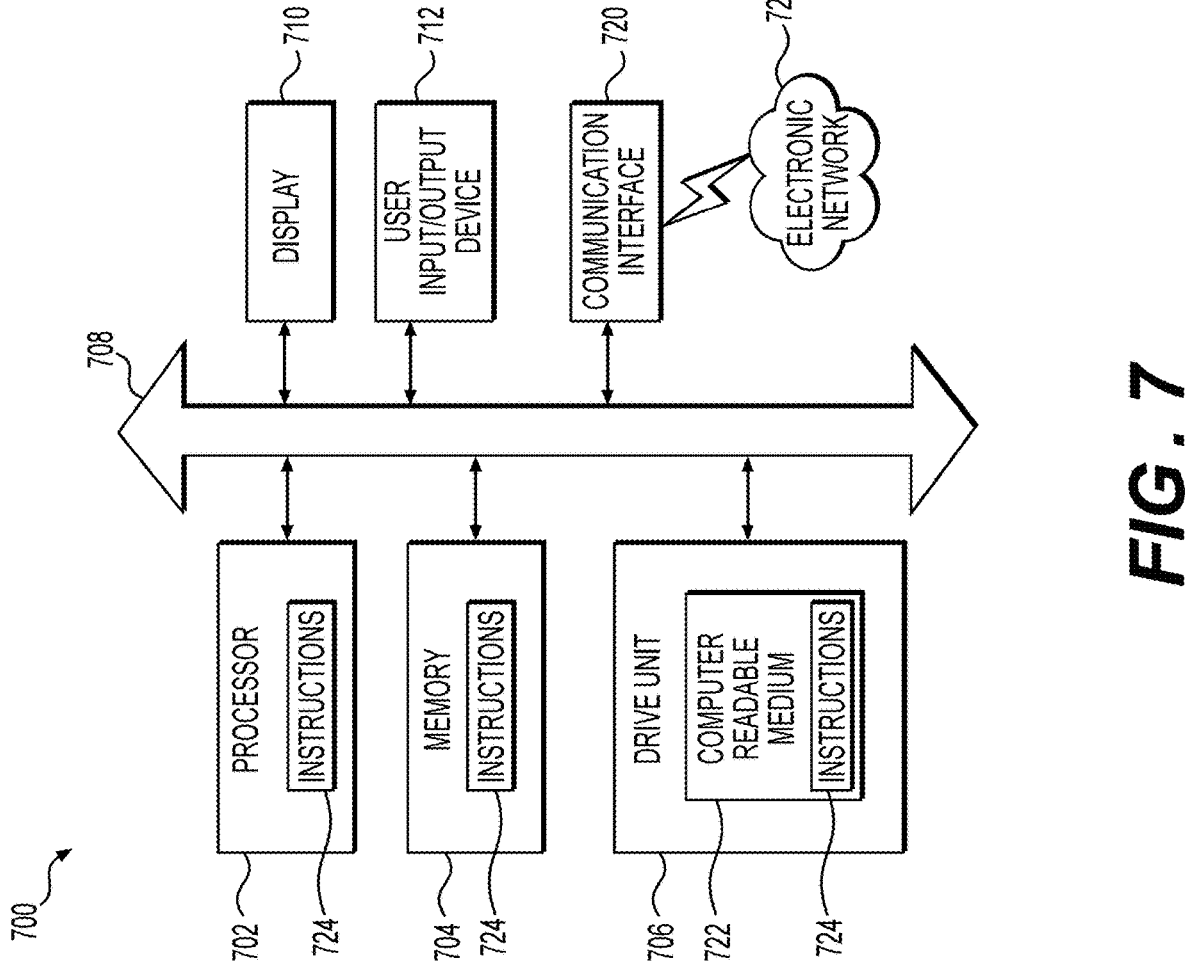
FIG. 7 depicts an exemplary computing server, according to one or more embodiments of the present disclosure.

FIG. 7 is a simplified functional block diagram of a computer system 700 that may be configured as a computing device for executing the process illustrated in FIGS. 5 and 6, according to exemplary embodiments of the present disclosure. FIG. 7 is a simplified functional block diagram of a computer that may be configured as the computer systems 100, 200, and/or 300 according to exemplary embodiments of the present disclosure. In various embodiments, any of the systems herein may be an assembly of hardware including, for example, a data communication interface 720 for packet data communication. The platform also may include a central processing unit ("CPU") 702, in the form of one or more processors, for executing program instructions. The platform may include an internal communication bus 708, and a storage unit 706 (such as ROM, HDD, SDD, etc.) that may store data on a computer readable medium 722, although the system 700 may receive programming and data via network communications via electronic network 725 (e.g., voice, video, audio, images, or any other data over the electronic network 725). The system 700 may also have a memory 704 (such as RAM) storing instructions 724 for executing techniques presented herein, although the instructions 724 may be stored temporarily or permanently within other modules of system 700 (e.g., processor 702 and/or computer readable medium 722). The system 700 also may include input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the process shown in FIGS. 5-6, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method, the computer-implemented method comprising operations including:

receiving, at a server, user authentication data provided to a media platform embedded within a hosting application, wherein the server is associated with a mediator component configured to process data transmissions between the media platform and the hosting application;

enabling, using a processor associated with the server and upon verifying the user authentication data, access to at least a portion of a media content library associated with a media content provider;

providing, within the media platform, one or more content viewing options associated with the media content library; and facilitating, responsive to receiving selection of the one or more content viewing options, playback of a media article corresponding to the one or more content viewing options within the media platform on the hosting application.

2. The computer-implemented method of claim 1, wherein the mediator component is further configured to:

detect that the hosting application utilizes a first data format and the media platform utilizes a second data format; and perform, for a data transmission between the hosting application and the media platform, a data transformation process to standardize the data transmission between the hosting application and the media platform.

3. The computer-implemented method of claim 1, wherein the media content provider is operated by a different entity than the hosting application.

4. The computer-implemented method of claim 1, further comprising operations including:

receiving, at the server, design characteristics associated with the hosting application; and adjusting one or more visual elements of the media platform to align with the design characteristics of the hosting application.

5. The computer-implemented method of claim 1, further comprising operations including:

receiving, at the server, characteristics of content presented on the hosting application;

comparing the characteristics of the content presented on the hosting application with stored media content in the media content library;

identifying a subset of the stored media content that share the characteristics; and updating the one or more content viewing options to reflect the subset of the stored media content that share the characteristics.

6. The computer-implemented method of claim 1, further comprising operations including:

receiving, at the server, user interaction data with the hosting application;

comparing the user interaction data with stored media content in the media content library;

identifying a subset of the stored media content that exhibit similarity to the user interaction data; and updating the one or more content viewing options to reflect the subset of the stored media content that exhibit similarity to the user interaction data.

7. The computer-implemented method of claim 1, wherein the user authentication data corresponds to a user-name-password pair.

8. The computer-implemented method of claim 1, wherein the verifying comprises:

determining, using the processor, that the user authentication data is of a correct format; and determining, using the processor, that the user authentication data matches stored authentication data associated with a valid user account.

9. The computer-implemented method of claim 1, wherein the enabling comprises:

determining, using the processor, a subscription status associated with an authorized user account corresponding to the user authentication data; and enabling, using the processor, access to the at least a portion of the media content library associated with the subscription status.

10. The computer-implemented method of claim 1, wherein the providing the one or more content viewing options comprises:

identifying, using the processor, a theme of content displayed on the hosting application; and prioritizing for presentation, using the processor, the one or more content viewing options based on the theme of the content displayed on the hosting application.

11. A system comprising:

a memory including instructions;

a server; and at least one processor associated with the server and configured to execute the instructions to perform operations comprising:

receiving user authentication data provided to a media platform embedded within a hosting application, wherein the server is associated with a mediator component configured to process data transmissions between the media platform and the hosting application;

enabling access to at least a portion of a media content library associated with a media content provider upon verifying the user authentication data;

providing one or more content viewing options associated with the media content library within the media platform; and facilitating, responsive to receiving selection of the one or more content viewing options, playback of a media article corresponding to the one or more content viewing options within the media platform on the hosting application.

12. The system of claim 11, wherein the mediator component is further configured to:

detect that the hosting application utilizes a first data format and the media platform utilizes a second data format; and perform, for a data transmission between the hosting application and the media platform, a data transformation process to standardize the data transmission between the hosting application and the media platform.

13. The system of claim 11, wherein the media content provider is operated by a different entity than the hosting application.

14. The system of claim 11, wherein the operations further comprise:

receiving design characteristics associated with the hosting application; and adjusting one or more visual elements of the media platform to align with the design characteristics of the hosting application.

15. The system of claim 11, wherein the operations further comprise:

receiving characteristics of content presented on the hosting application;

comparing the characteristics of the content presented on the hosting application with stored media content in the media content library;

identifying a subset of the stored media content that share the characteristics; and updating the one or more content viewing options to reflect the subset of the stored media content that share the characteristics.

16. The system of claim 11, wherein the operations further comprise:

receiving user interaction data with the hosting application;

comparing the user interaction data with stored media content in the media content library;

identifying a subset of the stored media content that exhibit similarity to the user interaction data; and updating the one or more content viewing options to reflect the subset of the stored media content that exhibit similarity to the user interaction data.

17. The system of claim 11, wherein the user authentication data corresponds to a username-password pair.

18. The system of claim 11, wherein the operations for verifying comprise operations for:

determining that the user authentication data is of a correct format; and determining that the user authentication data matches stored authentication data associated with a valid user account.

19. The system of claim 11, wherein the operations for enabling comprise operations for:

determining a subscription status associated with an authorized user account corresponding to the user authentication data; and enabling access to the at least a portion of the media content library associated with the subscription status.

20. The system of claim 11, wherein the operations for providing the one or more content viewing options comprise operations for:

identifying a theme of content displayed on the hosting application; and prioritizing for presentation the one or more content viewing options based on the theme of the content displayed on the hosting application.

* * * * *